(12) United States Patent
Coorg et al.

(10) Patent No.: US 6,259,452 B1
(45) Date of Patent: Jul. 10, 2001

(54) IMAGE DRAWING SYSTEM AND METHOD WITH REAL-TIME OCCLUSION CULLING

(75) Inventors: Satyan R. Coorg; Seth J. Teller, both of Cambridge, MA (US)

(73) Assignee: Massachusetts Institute Of Technology, Cambridge, MA (US)

( * ) Notice: Subject to any disclaimer, the term of this patent is extended or adjusted under 35 U.S.C. 154(b) by 0 days.

(21) Appl. No.: 09/045,295

(22) Filed: Mar. 20, 1998

Related U.S. Application Data

(60) Provisional application No. 60/043,682, filed on Apr. 14, 1997.

(51) Int. Cl.[7] .................................................... G06T 17/00
(52) U.S. Cl. .............................................. 345/421; 345/420
(58) Field of Search ................................... 345/421, 418, 345/419, 420, 427

(56) References Cited

U.S. PATENT DOCUMENTS

| | | | |
|---|---|---|---|
| 3,602,702 | * 8/1971 | Warnock | 345/421 |
| 4,594,673 | * 6/1986 | Holly | 345/421 |
| 4,694,404 | * 9/1987 | Meagher | 345/421 |
| 5,088,054 | * 2/1992 | Paris, II | 345/421 |
| 5,409,379 | * 4/1995 | Montag et al. | 434/2 |
| 5,509,110 | * 4/1996 | Latham | 345/421 |
| 5,903,272 | * 5/1999 | Otto | 345/421 |
| 5,926,182 | * 7/1999 | Menon et al. | 345/421 |
| 6,018,348 | * 1/2000 | Sprague | 345/421 |

FOREIGN PATENT DOCUMENTS

0740272 * 10/1996 (EP) ............................. G06T/15/10

OTHER PUBLICATIONS

IBM TDB, Hidden Line Elimination for Complex Surfaces, pp. 3873–3876, Apr. 1976.*

* cited by examiner

Primary Examiner—Cliff N. Vo
(74) Attorney, Agent, or Firm—Hamilton, Brook, Smith & Reynolds, P.C.

(57) ABSTRACT

To avoid needless processing of non-visible portions of a 3D scene, an occlusion culling method which dynamically identifies large occluders as the viewpoint moves is applied to discard non-visible polygons early in the graphics pipeline, i.e., in object space. The method is conservative, i.e., it overestimates the set of visible polygons; it exploits spatial coherence by using a hierarchical data structure; and it exploits temporal coherence by reusing visibility information such as supporting and separating computed for previous viewpoints. Objects are called from a three-dimensional object database if they are fully occluded from sight of the viewpoint due to either occluders near the viewpoint or occluders near the objects themselves. Objects which have not been called are drawn. Supporting planes tangential to an occluder and object set are used to determine occlusion.

36 Claims, 14 Drawing Sheets

Table: mapping triplets ⟨x,y,z⟩ to sets of silhouette vertices

| Triplet | Silhouette vertices | Comments and a picture of how the cube looks from the origin |
|---|---|---|
| ⟨0,0,0⟩ | { } | Origin is inside box |
| ⟨-1,0,0⟩ | {0,4,6,2} | Origin is to the left of box |
| ⟨0,-1,0⟩ | {0,1,5,4} | Origin is behind box |
| ⟨-1,-1,0⟩ | {0,1,5,4,6,2} | Origin is both left and behind box |
| ⟨-1,-1,-1⟩ | {3,1,5,4,6,2} | Origin is left, behind, and below box |

FIG. 11B

Tangent Vertex table mapping 6-bit codes to two vertices

| Code | Vertices | Comments/Example |
|---|---|---|
| 111000 | | Inside Silhouette-no tangent vertices (Point A) |
| 111110 | 5,4 | Point B |
| 111100 | 5,3 | Point C |
| 111101 | 4,3 | Point D |
| 011111 | 0,5 | Point E |
| 001111 | 1,5 | Point F |
| ⋮ | ⋮ | ⋮ |

IMAGE DRAWING SYSTEM AND METHOD WITH REAL-TIME OCCLUSION CULLING

RELATED APPLICATION

This application claims the benefit of U.S. Provisional Application No. 60/043,682, filed on Apr. 14, 1997, the content of which is incorporated herein by reference in its entirety.

BACKGROUND OF THE INVENTION

Computer modeling of a 3-dimensional space usually begins by defining a collection of "objects" existing within the space and maintaining this collection within a data base. The "definition" of an object includes enough information to allow a computer to draw, or render, the object from any perspective. Each object's location in "object space" coordinates is specified as well.

These objects are usually described in terms of vertices which define polygons in 3-dimensional object space. These polygons are then projected into a 2-dimensional image space, and drawn into a frame buffer which is used to display the polygons on a computer display.

Typically, a z-buffer is used to hide more distant objects behind objects nearer to the point of view. The z-buffer has an entry corresponding to each pixel in a frame buffer. While the frame buffer contains pixel color/intensity information, the z-buffer maintains a relative depth of each pixel. Before a pixel is overwritten in either buffer, a new pixel's depth is compared with the old (z-buffer) pixel's depth value. If the new pixel is closer, the frame buffer and z-buffer pixels are overwritten. Otherwise, the new pixel is discarded. In this manner, closer objects are displayed while objects obscured from view are not. While the actual z-buffer algorithm is usually implemented in hardware, all objects must first be processed, e.g. projected into 2-dimensional space and colored/textured, in order to be passed to the z-buffer, even though many of these objects are ultimately hidden. This is a very time-consuming and wasteful task.

Greene (U.S. Pat. No. 5,600,763), among others, attempts to improve on this by culling objects in image space. Greene does so by progressively subdividing the object space into smaller and smaller cubic spaces until either a size limit is reached or a cube is found to be the smallest cube that fully encloses a particular object. Greene tests for visibility of the cubes in image space, starting with the largest cube, and if that cube is visible, testing the sub-cubes therein, and so forth. Cubes that are not visible are culled before their associated objects are rendered. This would require significant modification to existing current graphics workstations.

Previous work by one of the present inventors, "Visibility Preprocessing For Interactive Walkthroughs", Teller and Séquin, Computer Graphics, Vol. 25, No. 4, July 1991, pp. 61–69, incorporated herein by reference, describes a process in which the "world" is divided early in the process into cells which have viewing portals into other cells. At start-up, it is determined for each cell which other cells are visible from the given cell. This information is maintained statically and allows culling of all cells (and objects therein) which are not visible from the cell holding the current viewpoint. As a refinement, a "view cone" is calculated to further dynamically cull cells that are not actually visible from the viewpoint as the viewpoint moves around. While this algorithm works well for architectural walk-throughs, it is not efficient for models with less apparent cell/portal structures such as outdoor city models.

SUMMARY OF THE INVENTION

Identifying visible polygons or eliminating hidden polygons is an important component of efficient scene rendering algorithms. Despite the availability of high performance z-buffer hardware, a significant fraction of graphics machines have lesser or no hardware z-buffering capabilities. Software z-buffering (e.g., on personal computers) can be a rendering bottleneck. Moreover, on many computer architectures, the z-test occurs after other graphics processing (e.g., shading, texture mapping), wasting computation on invisible portions of the model.

One way to address this problem is to develop occlusion culling algorithms that efficiently identify, then render, only the visible portions of the model or a tightly-bounded superset thereof. The present invention exploits the presence of large occluders in typical architectural or urban models to design a real-time occlusion culling algorithm.

In accordance with the present invention, an image constructed, relative to a viewpoint and a field of view, from a three-dimensional object data base is drawn. Individual occluders within the field of view are dynamically identified in object space. Any objects in the object data base which are within the field of view, but which are fully occluded from sight of the viewpoint by the identified occluders, are culled from the list of objects to be drawn. Objects which have not been culled from the object data base are drawn.

In a preferred embodiment, the object space is partitioned into octree nodes, or cells, and objects are culled by determining whether cells which contain the objects are fully occluded from sight.

Furthermore, information about viewing regions of object space from which objects are occluded may be dynamically determined. This information may be retained for reuse by subsequent culling operations.

In the preferred embodiment, a viewing region of object space, from which the object is occluded from sight, is defined. When the point of view is within the defined region, the object is culled. Such a region is defined by supporting planes which are tangential to an occluder and an object set. The object set may be, for example, a cell partitioned from the object space, or alternatively, the object set may be a single object.

Significant occluders are large objects which are near the viewpoint, thus potentially occluding a large volume of space relative to the viewpoint, or which are near other objects and therefore have the potential to occlude the other objects relative to the viewpoint.

In the preferred embodiment, significant occluders are identified by statically identifying potential occluders based on the apparent size of the objects and dynamically selecting significant occluders based on a current viewing direction. Such a determination of apparent size may be based on an estimate of the solid angle subtended by the potential occluder relative to the viewpoint, or alternatively, relative to the center of the object set.

Once the significant occluders are selected for a given viewpoint, it is determined which objects are completely occluded by the significant occluders, and these occluded objects are culled from the list of objects so as not to be rendered. Information pertaining to regions of object space from which each object is occluded is retained for reuse by subsequent culling operations. The set of regions thus identified due to large occluders near the viewpoint is dynamically maintained as the viewpoint moves around in object space.

The preferred embodiment uses a simple and fast visibility test that determines whether some region of the model is completely or partially occluded by a set of occluders. Second, a preprocessing step identifies nearby large occluders for all viewpoints. Finally, a hierarchical visibility algorithm repeatedly applies the visibility test to determine the status of octree nodes in a spatial hierarchy.

Culling occurs very early, in object space, before any other graphics transformations or operations are performed. It is therefore a very efficient process in that, once an object is culled from the list of objects, no further graphics processing or rendering need be done on that object.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

FIG. 9A shows occlusion caused by connected occluders whose silhouette is convex in the image. FIG. 9B shows occlusion by connected occluders having a non-convex silhouette. FIG. 9C shows occlusion by a set of disconnected occluders.

FIGS. 11A and 11B are a drawing and table demonstrating how silhouette vertices are determined.

DETAILED DESCRIPTION OF THE PREFERRED EMBODIMENTS

Figure 1:
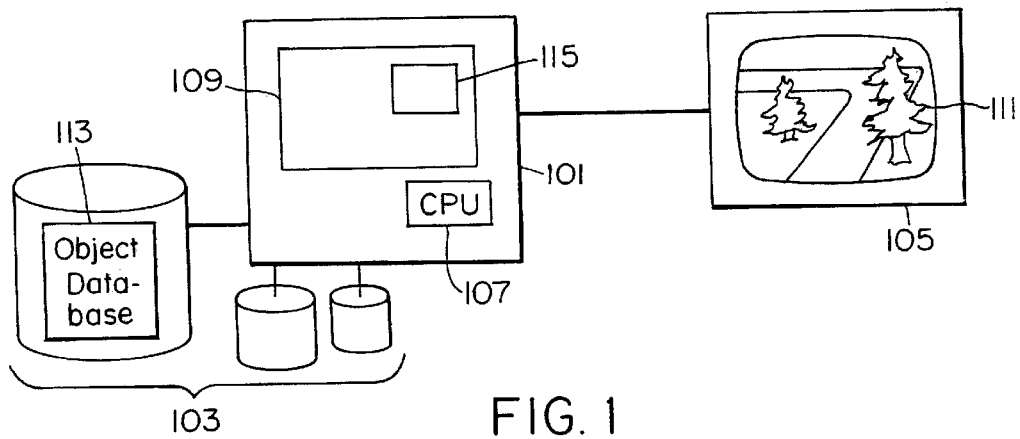
FIG. 1 is a block diagram of a typical graphics workstation.

As shown in FIG. 1, a typical graphics system comprises a desktop or tower computer 101, internal or external mass storage devices 103, and a monitor 105. The computer itself has a CPU 107, internal memory 109 and other circuits and functions. Typically, some scene 111 is to be drawn, or rendered, on the monitor 105. The scene may be composed of hundreds, thousands or even more objects such as streets, trees, buildings and so on. In order to be able to render these objects from a sequence of dynamically changing viewpoints, it is beneficial to represent each visual or virtual object as a data object, and to maintain in a database 113 a list of all objects in the virtual world. Such an object database is generally maintained on one or more mass storage devices 103. As a user "walks" through the virtual world defined by the object database, the objects are redrawn. This is typically done rapidly enough that the observer appears to be traveling smoothly through the virtual world. Of course, the more objects and the more detail, the more computing must be done between viewpoints and the more difficult it is to maintain smooth motion.

The present invention improves on existing techniques by culling certain objects before they are rendered, thus saving costly time the computer would otherwise have to use to render objects that will not be visible. Information related to pairs of objects, used in deciding whether to cull one of the objects, is maintained in a cache 115 in memory to further save execution time.

Figure 2:
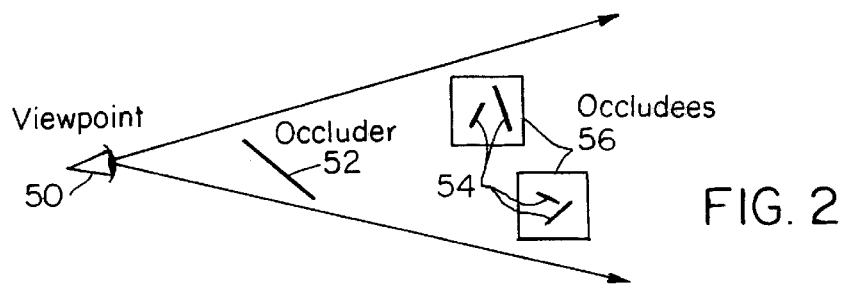
FIG. 2 is a drawing showing occluder polygons and occludee objects for an instantaneous viewpoint.

A small set of occluders is dynamically chosen to be used for culling. This strategy is motivated by the observation that, in many interesting models, from any instantaneous viewpoint most of the occlusion is caused by a few polygons. Polygons typically act as occluders for nearby viewpoints, so are therefore chosen dynamically as the viewpoint changes. The same polygons may be occludees as well (culled objects) for remote or oblique viewpoints. FIG. 2, for example, shows a polygon 52 near the viewpoint 50 acting as an occluder for more distant (from viewpoint 50) polygons 54. Usually, the occludee is not just a single polygon, but a convex region of space containing many polygons 54, e.g., a hierarchical bounding box 56.

The present invention uses an efficient occlusion culling method that exploits the presence of large occluders in 3D object space, and culls a significant fraction of objects before rendering a scene.

Applying a visibility test to every possible visual interaction (which could consume $O(n^2)$ resources, for n polygons) is expensive. Instead, three techniques reduce the number of visibility tests performed. First, spatial coherence is exploited by organizing the polygons in an octree as described below. Second, a small, dynamically maintained set of occluders near the viewpoint is used to determine occlusion. Third, a small set of occluders near each octree node is also used to determine occlusion.

Figure 3:
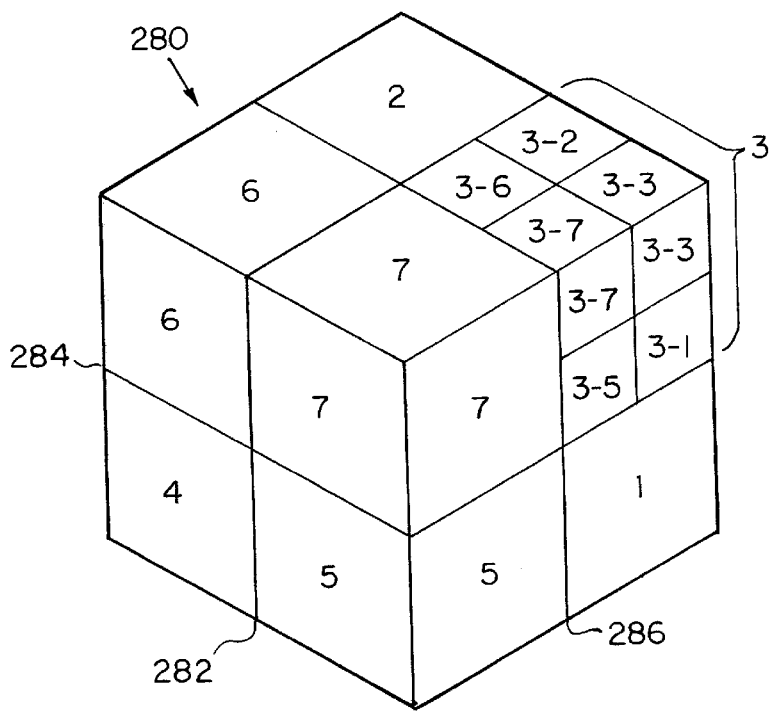
FIG. 3 is a drawing showing the geometric structure which forms the basis of an octree data structure.
Figure 4:
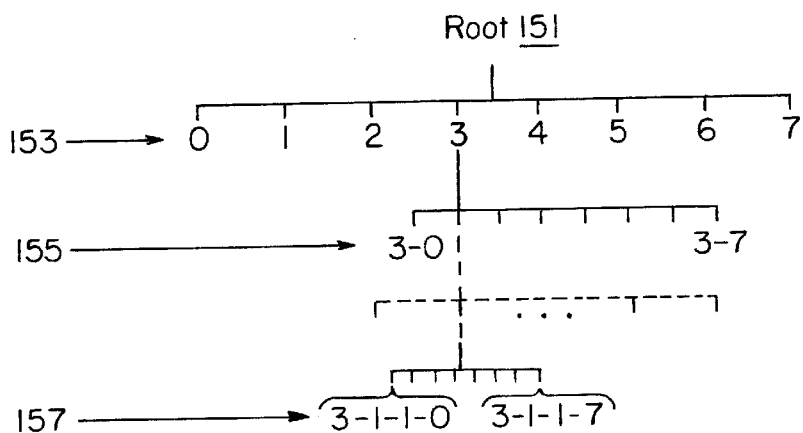
FIG. 4 is a tree diagram showing an octree structure corresponding to the object space of FIG. 3.

FIG. 3 demonstrates the division of a three-dimensional space 280 into octants and sub-octants. First, the space 280 is bisected by three orthogonal planes 282, 284, 286, forming eight octants, here numbered 0 through 7 (octant 0 is not visible). For demonstration purposes, octant 3 is further divided into sub-octants, here labeled 3-0 through 3-7 (octants 3-0 and 3-1 are not visible). In practice, all sub-octants are further divided a predetermined number of times. FIG. 4 shows an octree data structure corresponding to the three-dimensional space of FIG. 3. The root node 151 corresponds to the entire space 280 of FIG. 3, and contains eight subnodes 153, each corresponding to an octant of FIG. 3. Each subnode in turn contains eight subnodes 155 corresponding to the next subdivision of the octants of FIG. 3. For demonstration purposes, only subnodes 3-0 through 3-7, corresponding to sub-octants 3-0 through 3-7 of FIG. 3, are shown. At some point, division of the space ceases, and the smallest sub-octants of the space 280 correspond to the lowest level in the octree structure, called leaves 157. Information can thus be easily associated with particular nodes, including leaves.

Temporal coherence in the motion of the observer is exploited by caching large occluders and occlusion relations between sequential viewpoints.

Figure 5:
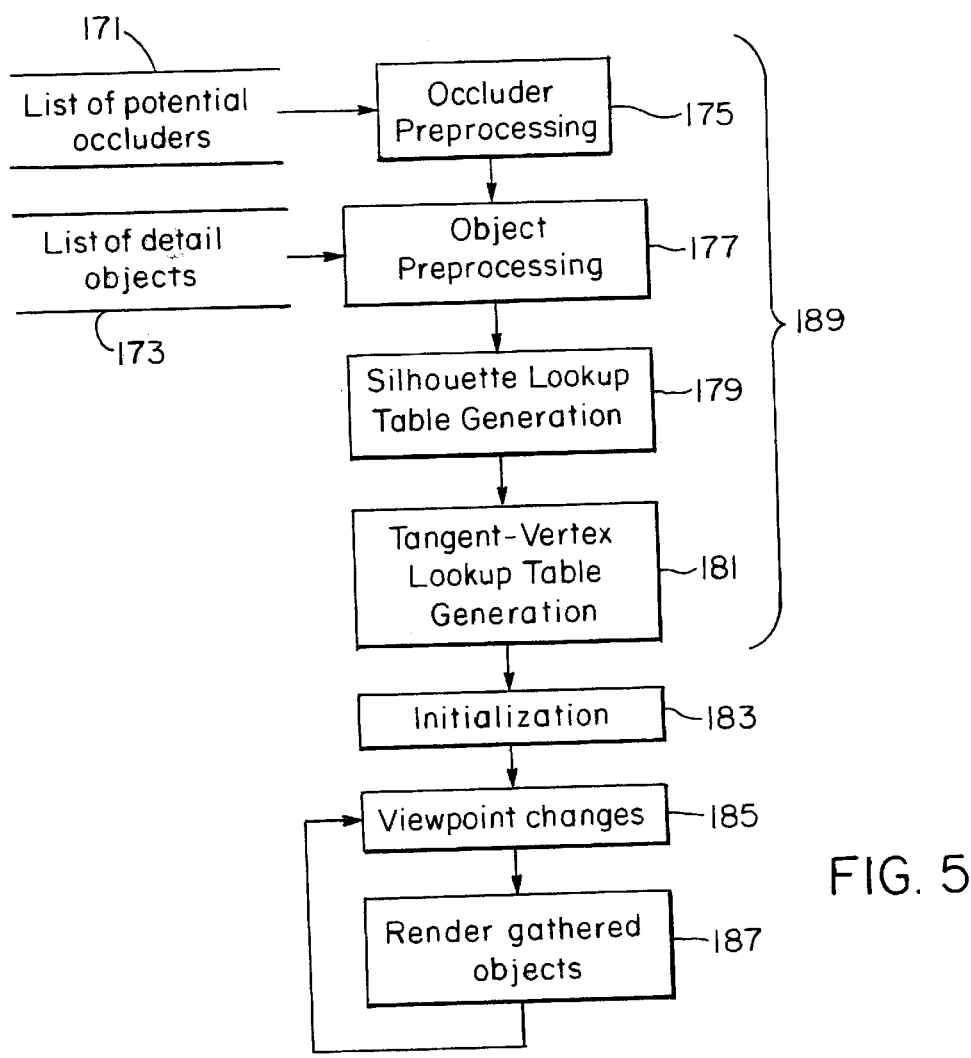
FIG. 5 is a basic flowchart of the invention.

FIG. 5 is a basic flowchart of the invention. Preprocessing operations 189 include occluder preprocessing 175, object preprocessing 177, silhouette lookup table generation 179 and tangent-vertex lookup table generation 181. Two lists of objects are provided: a list of potential occluders 171 and a list of detail objects 173. Although not necessary, in the preferred embodiment these lists are mutually exclusive. The list of potential occluders 171 serves as input to the occluder preprocessing 175. For each octree node, occluder preprocessing generates associations between each of eight discrete viewing directions and potential occluders. The list of detail objects 173 serves as input to the object preprocessing 177. Object preprocessing generates associations between potential occludees or detail objects, and potential occluders. Both occluder and object preprocessing limit the number of potential occluders that must be examined during a walk-through for any particular viewpoint and viewing direction.

Silhouette lookup table generation 179 and tangent-vertex lookup table generation 181 generate information used to reduce the amount of calculations. Each of the preprocessing operations 189 is discussed below.

After preprocessing 189, initialization 183 occurs, after which the dynamic walkthrough is performed. For each viewpoint or viewing direction change 185 a subset of occludees is determined using a conservative visibility test and culled from the list of objects to be rendered for the current viewpoint and viewing angle. Finally, after culling, objects not culled from the list are rendered 187 according to traditional techniques.

Conservative Visibility Testing

A conservative visibility test determines whether, given a viewpoint, a set of convex occluders and a convex occludee, the occludee is visible, i.e., whether there exists a line segment from the viewpoint to some point on the occludee that meets no occluder. The test uses the concept of supporting and separating planes, demonstrated in FIG. 6. A separating plane 68 of two convex polyhedral objects A,T is a plane formed by an edge E of one object A, and a vertex $V_1$, for example, of the other object T such that the objects A,T lie on opposite sides of the plane 68. Supporting planes 66 are analogous, except that both objects A,T lie on the same side of the plane 66.

Figure 6:
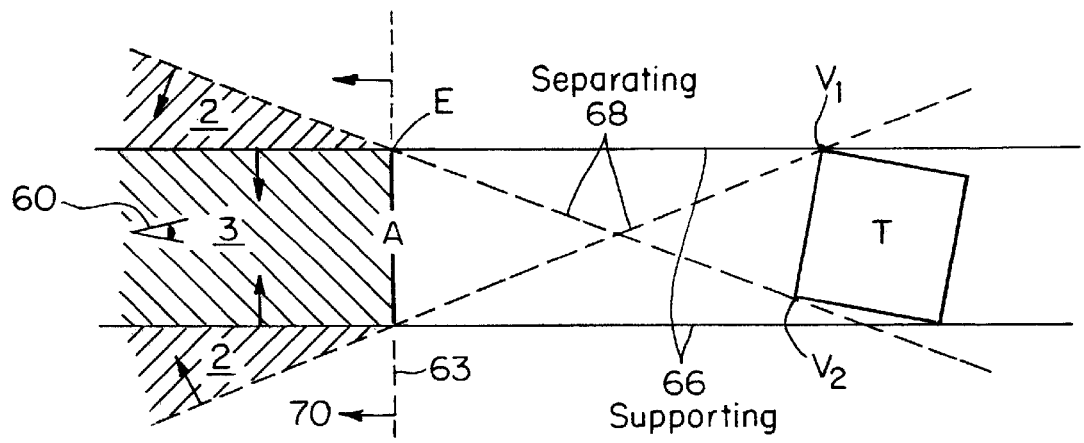
FIG. 6 is a drawing demonstrating occlusion in two dimensions (a planar cross section of 3D). Separating and supporting planes of an occluder A and an occluder T are shown, as is a synthetic viewpoint.

FIG. 6 further demonstrates the interaction between a single occluder A and an occludee T (typically a bounding box). This can be completely described in terms of the plane 63 of occluder A and the supporting planes 66 and separating planes 68 of A and T. First, A can occlude T only if the viewpoint 60 lies in that half-space 70 of A which does not contain T. This region 70 can be divided into three qualitatively distinct regions. In region 1, T is not occluded by A; in region 2, T is partially occluded by A; and in region 3, T is completely occluded by A.

The supporting planes 66 and separating planes 68 of A and T can be used to detect in which of these regions the viewpoint 60 lies. First, the planes are oriented toward occluder A to form half-spaces. We say that a viewpoint satisfies a plane if and only if it is inside the plane's positive half-space, i.e., the same side of the plane as the occluder. This relation can be checked by performing an inner product of the viewpoint vector with the plane normal vector. Full occlusion occurs when all of the supporting planes 66 are satisfied, that is, when the viewpoint 60 is in the intersection of the supporting half-spaces (region 3). Partial occlusion occurs when all the oriented separating planes 68 are satisfied, but some supporting plane is not (region 2). Otherwise, there is no occlusion (region 1).

Figure 7:
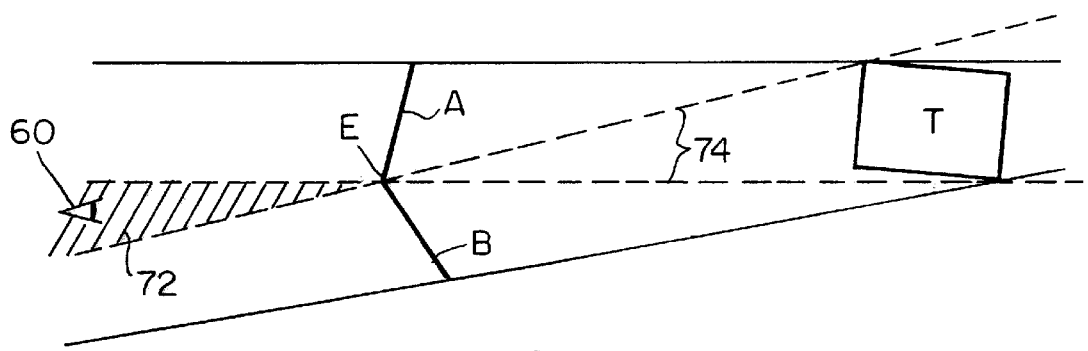
FIG. 7 is a drawing demonstrating occlusion by connected occluders A and B.

Occlusion may also be caused by more than a single cccluder. FIG. 7 shows occlusion caused by two connected occluders A,B, i.e., two occluders that share an edge E. If the viewpoint 60 is in the shaded region 72, object T is occluded by the combined effect of A and B, even though neither occludes it alone. This case is handled by ignoring the supporting planes 74 through the non-silhouette shared edge E, if both polygons A, B adjacent to E partially occlude T.

Figure 8:
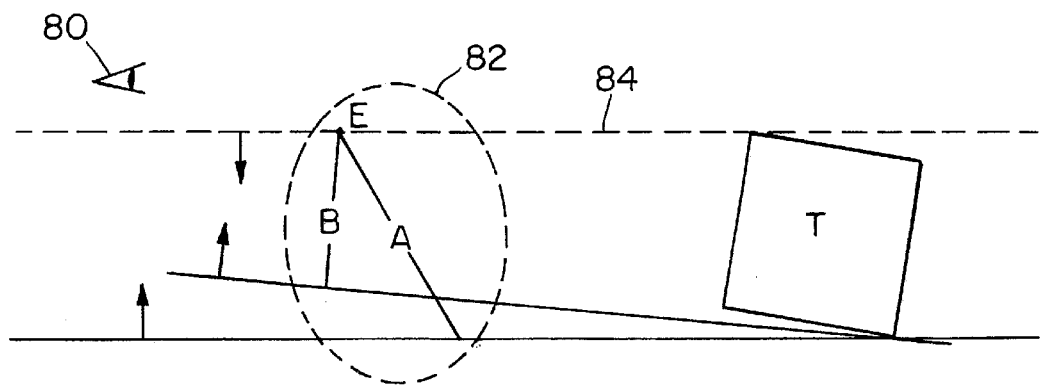
FIG. 8 is a drawing demonstrating that supporting planes through shared silhouette edges cannot be ignored.

FIG. 8 demonstrates that occlusion by two connected occluders A,B occurs only when the occluders lie on opposite sides of their common edge E, as seen from the viewpoint 80. Intuitively, common edge E is relevant only when it is a silhouette edge of the occluder 82 as seen from the viewpoint 80. FIG. 8 shows a case in which ignoring the supporting plane (dashed) 84 through common edge E would cause T to be classified, incorrectly, as not fully occluded.

In general, a set of occluders $A_1, \ldots, A_k$ jointly occludes T if:

1. $A_1, \ldots, A_k$ partially occlude T, and none fully occludes T;
2. If two occluders $A_i$ and $A_j$ share an edge E, they lie on opposite sides of edge E as seen from the viewpoint; and
3. The signed distances of the viewpoint from all planes, other than those supporting common edges, are positive.

Figure 9A:
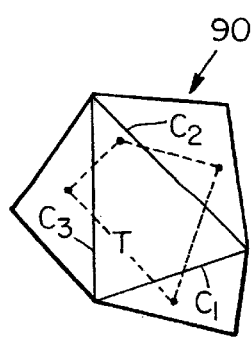
FIGS. 9A–9C show occlusion in 3D as seen from the viewpoint.
Figure 9B:
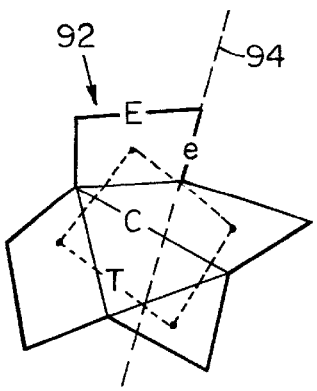
Figure 9C:
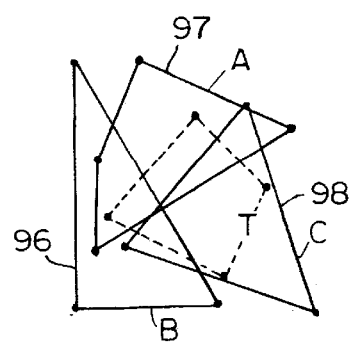

FIGS. 9A–9C, which depict three different occlusion cases, show why the test described above is conservative. In FIG. 9A, supporting planes (not shown) through the "internal" edges C1–C3 are ignored. The occludee T lies entirely within the convex silhouette of occluder 90 and the test detects occlusion. On the other hand, the test may not detect occlusion if the silhouette edges form a non-convex polygon. For example, in FIG. 9B the test fails as the occludee T appears to "cross" the line 94 supporting edge E in the image of occluder 92. Finally, as FIG. 9C demonstrates, the test does not detect occlusion caused by a set of disconnected occluders 96, 97, 98. In practice, this is a reasonable tradeoff for architectural, urban and other models, where most occlusion is due to large occluders acting alone or as part of a connected set. This visibility test is thus conservative in that while it may classify an occluded entity as visible, as shown in FIGS. 9B and 9C, it never misclassifies a visible entity as occluded.

The above process is simple to implement given the supporting and separating planes corresponding to a single occluder and occludee. An efficient way to compute these planes is described now.

Computing Supporting and Separating Planes

In principle, it is possible to precompute all planes formed by occluder/occludee pairs. However, this would be wasteful, as only a small fraction of such planes would ever be used. Instead, the present invention uses a hybrid method that combines preprocessing and run-time table lookups to compute supporting and separating planes formed by an (arbitrary) occluder and an axial bounding box (an occludee).

Figure 10:
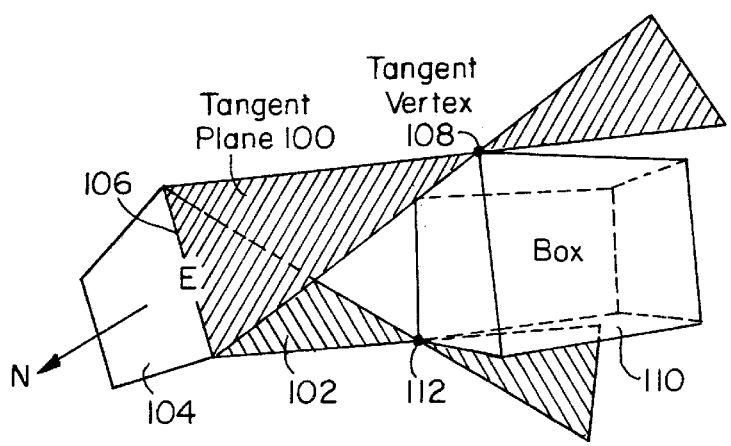
FIG. 10 is a drawing showing tangent planes through a polygon edge.

The supporting and separating planes of an occluder/occludee pair are restricted to the set of tangent planes formed by occluder edges and occludee vertices. Those planes formed by occluder vertices and occludee edges are ignored. Assembling only these planes provides an exact test for full occlusion, and a conservative test for partial occlusion. FIG. 10 shows two tangent planes 100, 102 formed from occluder edge 106 and tangent vertices 108 and 112. Note that tangent plane 100 is a supporting plane while tangent plane 102 is a separating plane.

Tangent vertices (and consequently, tangent planes) for each occluder edge are computed using the following steps. This method speeds up computation of supporting and separating planes, a key component of the visibility test, by an order of magnitude over the naive method of computing and checking planes through each vertex of the bounding box.

First, the occludee bounding box and occluder are translated so that the origin is one vertex of the occluder edge 106.

Next, the silhouette of the bounding box, as seen from the origin, is determined using a table lookup based on the position of the box's vertices with respect to the origin. This table is created during pre-processing and translates 3-bit codes representing regions of space to lists of vertices.

Figure 11A:
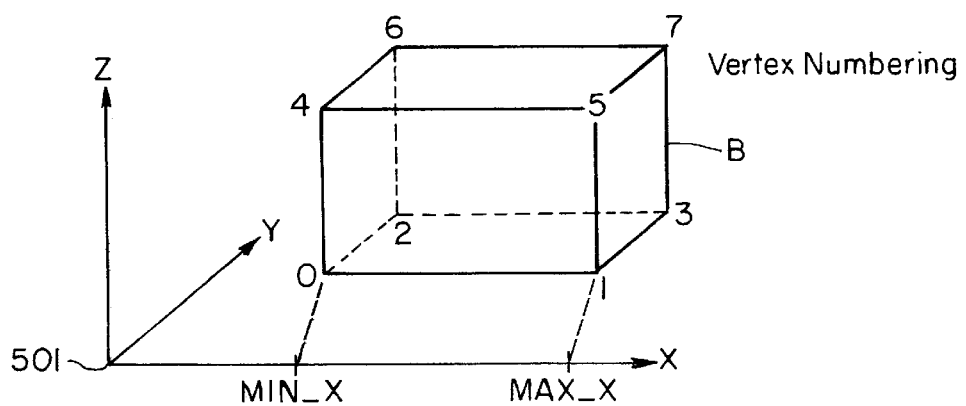

FIGS. 11A and 11B show a table demonstrating a sampling of mappings of triplets of values (x,y,z) to sets of silhouette vertices depending on the position of the origin with respect to a particular cube (or cell). Each of x, y, z takes a value of either −1, 0 or +1 based on the following comparison algorithm.

Given a bounding box B with minimum and maximum x values of MIN_X and MAX_X, respectively, if MIN_X>0 (i.e., the origin, being one vertex of the occluder, is to the "left" of both faces of B), then x=−1. If the origin is between the two faces of B (MIN_X≦0<MAX_X), then x=0. Otherwise, the origin is to the "right" of both faces of B and x=+1. Values for y and z are computed similarly.

For example, FIG. 11A shows a bounding box B with vertices numbered 0 through 7. The bounding box B is offset from the origin 501. The column labeled "Triplet" has an entry for several of the twenty-seven possible combinations of (x,y,z). Of course, the actual table for the present invention contains all twenty-seven possibilities. The second column "Silhouette vertices", maps a given triplet to the set of vertices which form the silhouette of box B as seen from the origin. The third column provides comments. In particular, the entry for the triplet <−1,0,0> shows this combination indicates that the origin is to the left of box B as shown, and therefore that the silhouette vertices are vertices 0, 4, 6 and 2 as indicated in the "Silhouette Vertices" column.

Figure 12:
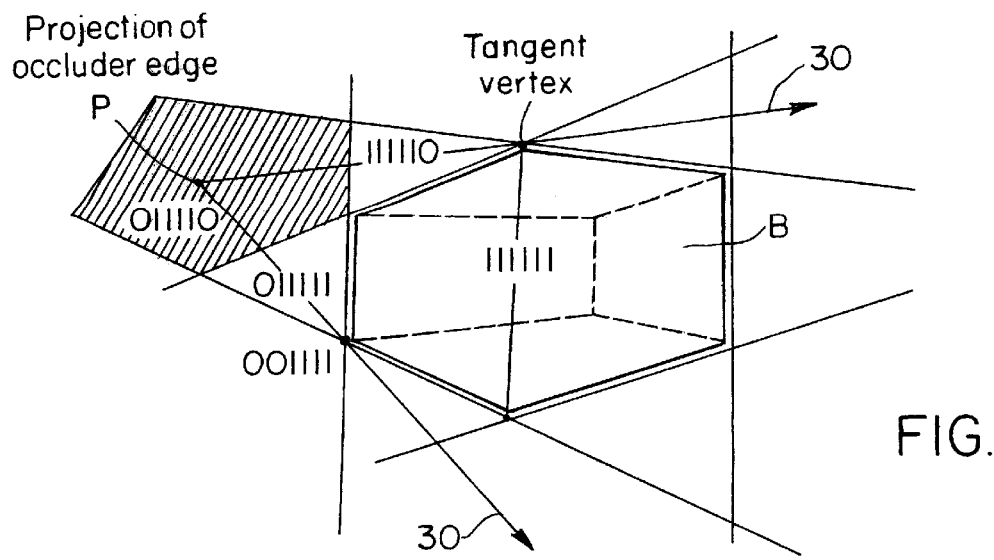
FIG. 12 is a drawing showing the projection of a box with respect to the origin, shown in 2D.

Finally, in a 2D projection with respect to the origin (along a direction toward the box B), the occluder edge projects to a single point P as shown in FIG. 12. The tangents 30 from this point to the box's silhouette are determined. As the property of tangency is retained by projection, the tangent vertices determined in 2D are the tangent vertices in 3D.

Computing tangent vertices in 2D is a table lookup based on the location of the edge projection with respect to the silhouette edges. Due to the special properties of the silhouette edges (i.e., projection of axial edges with respect to the origin), this computation can be easily performed. This table is created during pre-processing. A line equation for each silhouette edge is oriented such that the silhouette lies on the positive side of the line. Regions induced by extended silhouette edges are numbered using 4- or 6-bit codes, for 4- and 6-vertex silhouettes respectively. The codes consist of 0s and 1s, indicating respectively that a region is on the negative or positive side of the line. Tangent vertices are determined by the region with which the occluder edge's projection lies.

Figure 13:
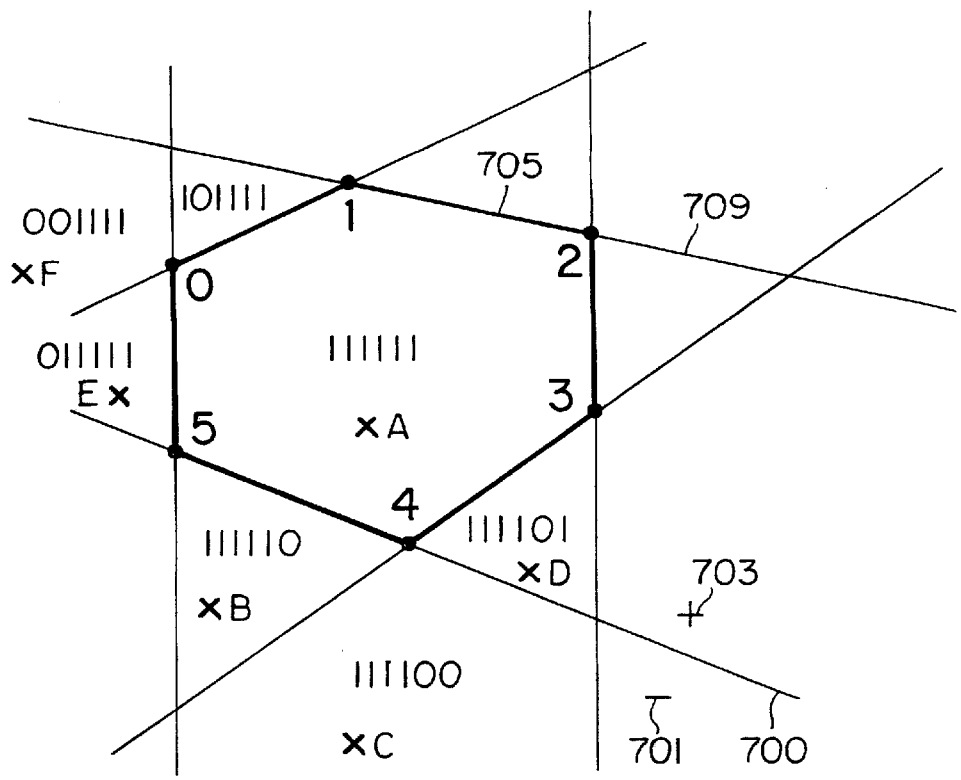
FIG. 13 is a drawing and table demonstrating the mapping from sextuples to pairs of tangent vertices.

FIG. 13 shows a portion of the 6-bit tangent-vertex table. The extension 700 of the silhouette edge connecting points 4 and 5, is oriented such that the silhouette 705 lies on the positive side, or inside, of line 700, as indicated by the plus sign (+) 703. Points B and C, on the other hand, lie on the negative side of line 700, indicated by a negative sign (−) 701.

Note that a 4-bit table is used when there are four silhouette edges (i.e., seeing only one face), as determined from the lookup table described in FIGS. 12A and 12B. The 6-bit table, FIG. 13, is used when there are six silhouette vertices (i.e., looking at a corner).

The 4-bit table (not shown) maps quadruples of bits to pairs of vertices that are the tangent vertices. The 6-bit table of FIG. 13 similarly maps sextuples of bits to pairs of vertices that are the tangent vertices. Each element of the sextuplet is computed as follows. Let (x,y) be the position of the projected occluder edge endpoint. If (x,y) is on the positive side, then the respective element is 1, otherwise it is 0. For example, point A inside the silhouette has code (111111). Point B has code (111110) which maps to {5,4}, signifying that vertices 5 and 4 comprise the tangent vertices of the silhouette of box B, as seen from the origin, for which planes need to be computed. Several other points are demonstrated in the figure.

Occluder Preprocessing and Dynamic Viewpoint-based Occluder Selection

The preferred embodiment maintains the state of each octree node with respect to a set of occluders. As the viewpoint moves, it is crucial to update this occluder set to contain those polygons that are "large" in the image, and therefore likely to occlude substantial portions of the model. Likewise, polygons that become small in apparent size should be ejected from the set.

A simple metric for the occlusion potential of a polygon from a given position is the solid angle it subtends at that position. A reasonable estimate of solid-angle is the "area angle", given by $$\frac{-A(\vec{N} \cdot \vec{V})}{\|\vec{D}\|^2}$$

Figure 14:
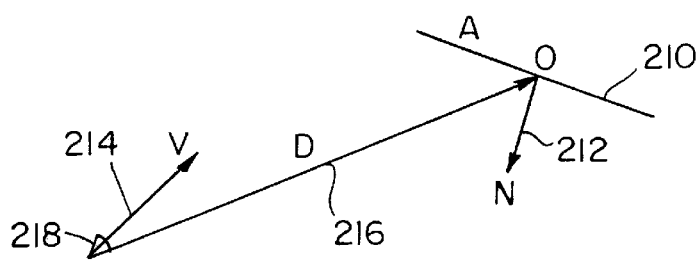
FIG. 14 is a drawing showing the parameters used in the calculation of the area-angle metric.

FIG. 14 shows the parameters in relation to the occluder and viewpoint. A represents the area of the occluder 210, $\vec{N}$ represents its normal 212, $\vec{V}$ represents the viewing direction 214, and $\vec{D}$ represents the vector 216 from the viewpoint 218 to the center of the occluder 210. This area-angle metric captures several properties of the subtended solid angle of occluder 210, making it a useful approximation. First, larger polygons have larger area-angle. Second, the area-angle falls as the square of the distance from the viewpoint, as does the subtended angle. Third, maximum area-angle occurs when the viewing direction $\vec{D}$ is "head-on" with the occluder, and falls with the dot product as the occluder is viewed obliquely. While this metric differs from the solid-angle in that it does not consider the actual shape of the occluder, it is much simpler to compute, and serves as a useful heuristic to identify large occluders near the viewpoint.

Given a discretization of all possible viewing directions, the occluder preprocessing algorithm uses the area-angle metric to associate each octree leaf and viewing direction with those $M_1$ occluders likely to be most effective from viewpoints in that leaf. The number of occluders $M_1$ is a parameter supplied to the preprocessing stage.

When interactive model viewing begins, an octree leaf containing the initial viewpoint is chosen. A set of $M_1$ occluders associated with the octree leaf and discrete viewing direction closest to the current viewing direction is selected. When the viewpoint moves outside the octree cell or the viewing direction changes substantially, the set of occluders is modified to correspond to the new viewing position and direction. Note that if the observer is moving smoothly, the set of occluders effective from one viewpoint is likely to be similar to the set of occluders effective from the next viewpoint, and little or no changes need be made to the occluder set.

Figure 15:
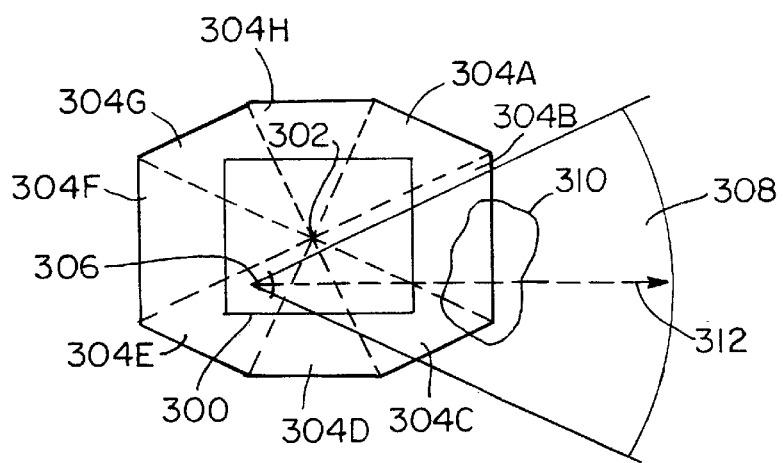
FIG. 15 is a drawing showing the discretization of viewing directions for a given octree node.

FIG. 15 demonstrates how occluders are associated with a given cell 300 which may be a leaf or a node. From the center 302 of the cell, a number (eight in the preferred embodiment) of viewing zones 304A–304H are established. For each viewing zone, a list of potential occluders is created, based on the "closeness" of an object to the cell, and the apparent size of the object, relative to the cell. For example, object 310 may be a potential occluder for both viewing regions 304B and 304C. In the preferred embodiment, the $M_1$ largest objects greater than some threshold are selected as potential occluders for some $M_1$.

During a walkthrough, the viewpoint will most likely not be found at the center of a node. Rather it may be at some arbitrary point 306 within the node. In addition, the viewing angle 308 need not be, and usually will not be, the same angle as any of the viewing regions 304A–304H. Some viewing region is selected which most closely corresponds with the actual viewing direction of the viewpoint, and significant occluders are selected from the list of potential occluders associated with that viewing region. In FIG. 15 viewing region 304B corresponds most closely with the actual viewing direction 312. Thus, the significant occluders for this viewpoint 306 will be determined from the list of potential occluders associated with viewing region 304B, which includes object 310.

Figure 16A:
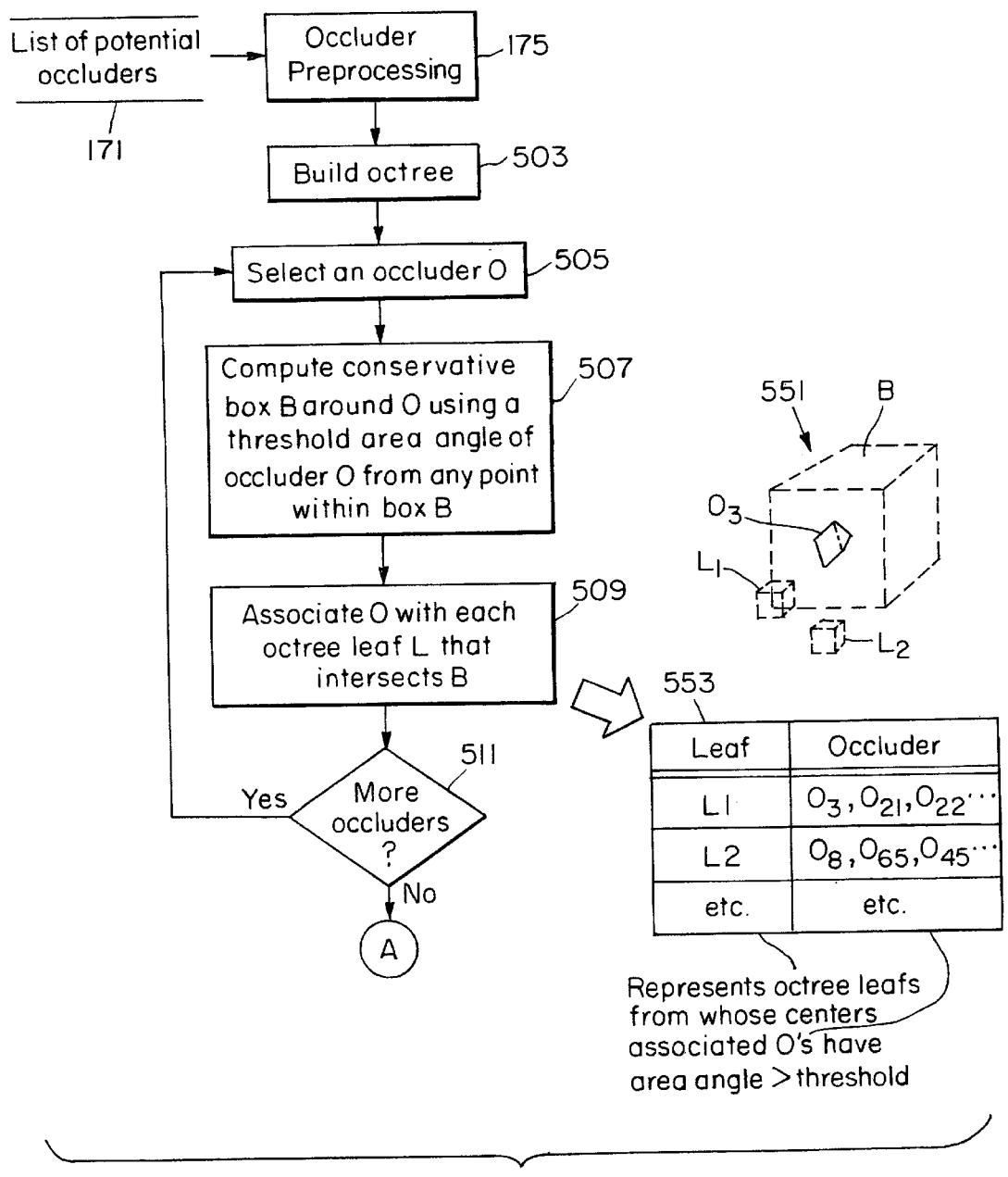
FIGS. 16A and 16B are a flowchart of the occluder preprocessing procedure.
Figure 16B:
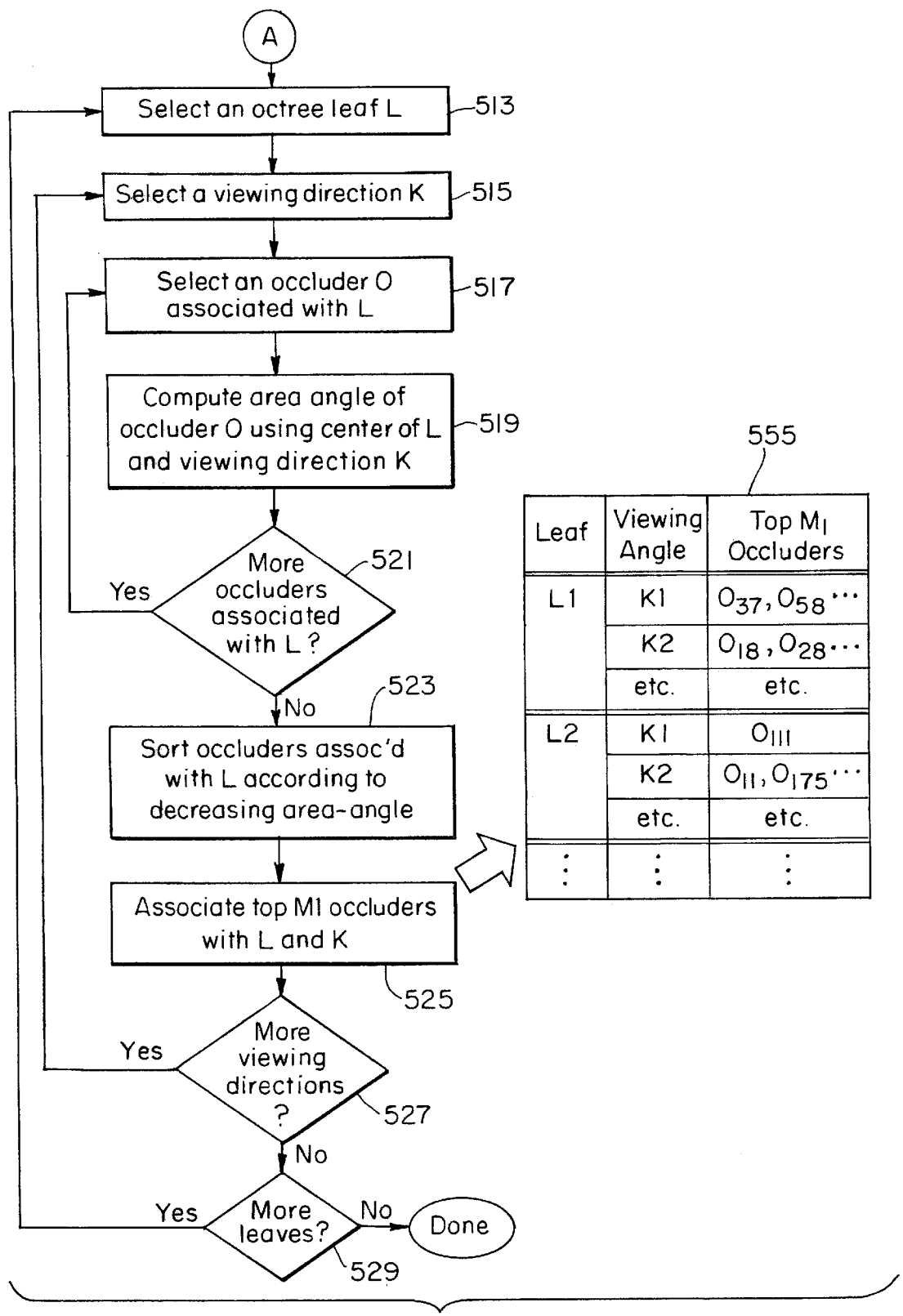

FIGS. 16A and 16B are a flowchart of the occluder preprocessing procedure 175. A predetermined list of potential occluders 171 is provided and used as input into the procedure. First, in step 503, an octree is built, as described earlier, with the size of the leaves determined by some parameter. Next, loop 505–511 is executed for each occluder O in the list.

After an occluder O is selected in step 505, a "conservative" box B is computed in step 507 such that box B completely encloses O, and additionally, so that relative to any point within box B, the area angle of O exceeds some threshold area angle. In step 509, occluder O is associated with each octree leaf that intersects with box B. This concept is depicted by reference 551. A box B has been calculated which encloses occluder O3. From any point within box B, the area angle of O3 with respect to that point exceeds a predetermined threshold area angle. Boxes L1 and L2 represent two different leafs of the octree. L1 intersects with box B and is therefore associated with occluder O3 in a table 553. L2 does not intersect with box B and is therefore not associated with occluder O3 in this table 553. After the loop 505–511 has completed, table 553 holds all associations of leaves and occluders.

The next step is to create a table 555 which associates up to $M_1$ occluders with each of eight viewing angles for each octree leaf. Outer loop 513–529 is executed for each leaf L in the octree. Within the outer loop, a mid-level loop 515–527 is executed for each of the eight viewing angles K. In the inner-most loop 517–521, an occluder O which has been associated with leaf L from table 553 is selected (step 517). In step 519, the area angle of occluder O is calculated with respect to the center of leaf L and the viewing direction K. After completion of this inner loop 517–521, in step 523 the occluders associated with leaf L are sorted in order of decreasing area-angle. Finally, in step 525, the top $M_1$ occluders are associated with leaf L and viewing angle K, as shown in table 555. This process is repeated for each of the viewing angles for each leaf in the octree.

Object Preprocessing and Dynamic Object-based Occluder Selection

Much of the polygon complexity in urban and architectural models arises due to the presence of small "detail" objects (e.g., furniture in a building, foliage in a city). As they are also part of the octree hierarchy, these objects may be culled by the hierarchical culling algorithm. Objects that are not culled are subjected to additional tests. Each such object is tested against occluders that are "near" the object. These tests can cull objects even if there are no large occluders near the viewpoint.

Figure 17:
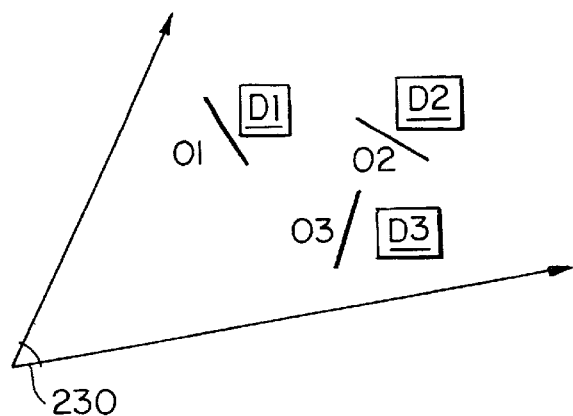
FIG. 17 is a drawing showing detail objects and occluders used to determine their visibility.

FIG. 17 demonstrates this principle. Detail objects D1, D2, D3 exist at a distance from the viewpoint 230. Occluders O1, O2, O3 that are near detail objects D1, D2, D3 respectively can be determined as follows. First, as detail objects are usually limited in spatial extent, they can be usefully approximated as a single point (e.g., the center of the object). Second, the problem of determining whether the detail object is visible from the viewpoint is identical to the problem of determining whether the viewpoint is visible from the detail object (i.e., visibility between two points is reflexive). Thus, occluders that are large when viewed from the center of the detail object (in a viewing direction toward the viewpoint) are good candidates to test. These are identified and stored for each object using the octree data structure previously computed. Of course, once these occluders are determined, it is necessary to perform the visibility test on the entire detail object using separating and supporting planes, instead of just on its midpoint.

Figure 18:
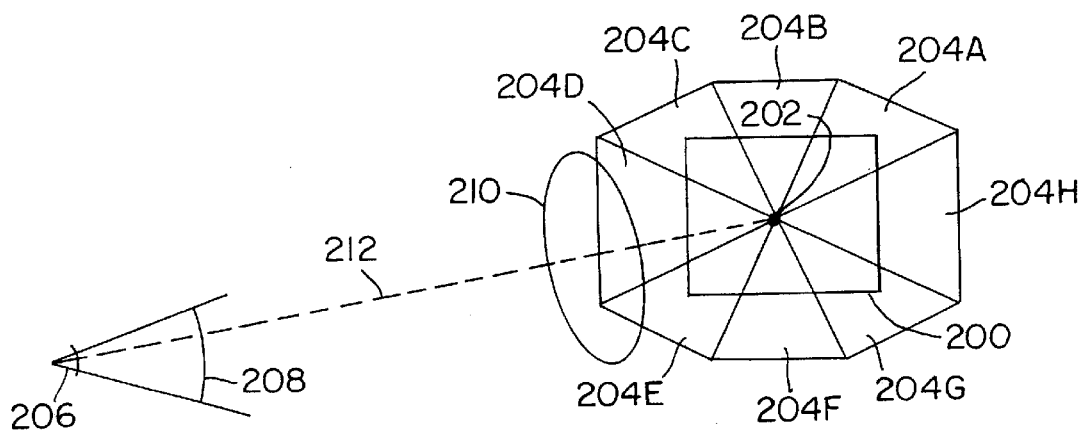
FIG. 18 is a drawing showing the discretization of viewing directions for a given detail object.

FIG. 18 is similar to FIG. 15, but demonstrates how occludees or detail objects are associated with a given cell 200, which may be a leaf or a node. From the center 202 of the cell, a number (eight in the preferred embodiment) of viewing zones 204A–204H are established. For each viewing zone, a list of nearby potential occluders is created, based on the "closeness" of an object to the cell, and the apparent size of the object, relative to the cell. For example, object 210 may be a potential occluder for both viewing directions 204D and 204E. In the preferred embodiment, the $M_2$ largest objects greater than some threshold are selected as potential occluders for some $M_2$.

During a walkthrough, the synthetic viewpoint will be at some arbitrary point 206 in space. A viewing angle is selected which most closely corresponds with the line of site 212 from the viewpoint the center 202 of the cell, and significant occluders are selected from the list of potential occluders associated with that viewing region for that cell. In FIG. 18, viewing region 204D corresponds most closely with the actual line of site 212. Thus, the significant occluders for this cell 200 and viewpoint 206 will be determined from the list of potential occluders associated with viewing region 204D, which includes object 210.

Figure 19:
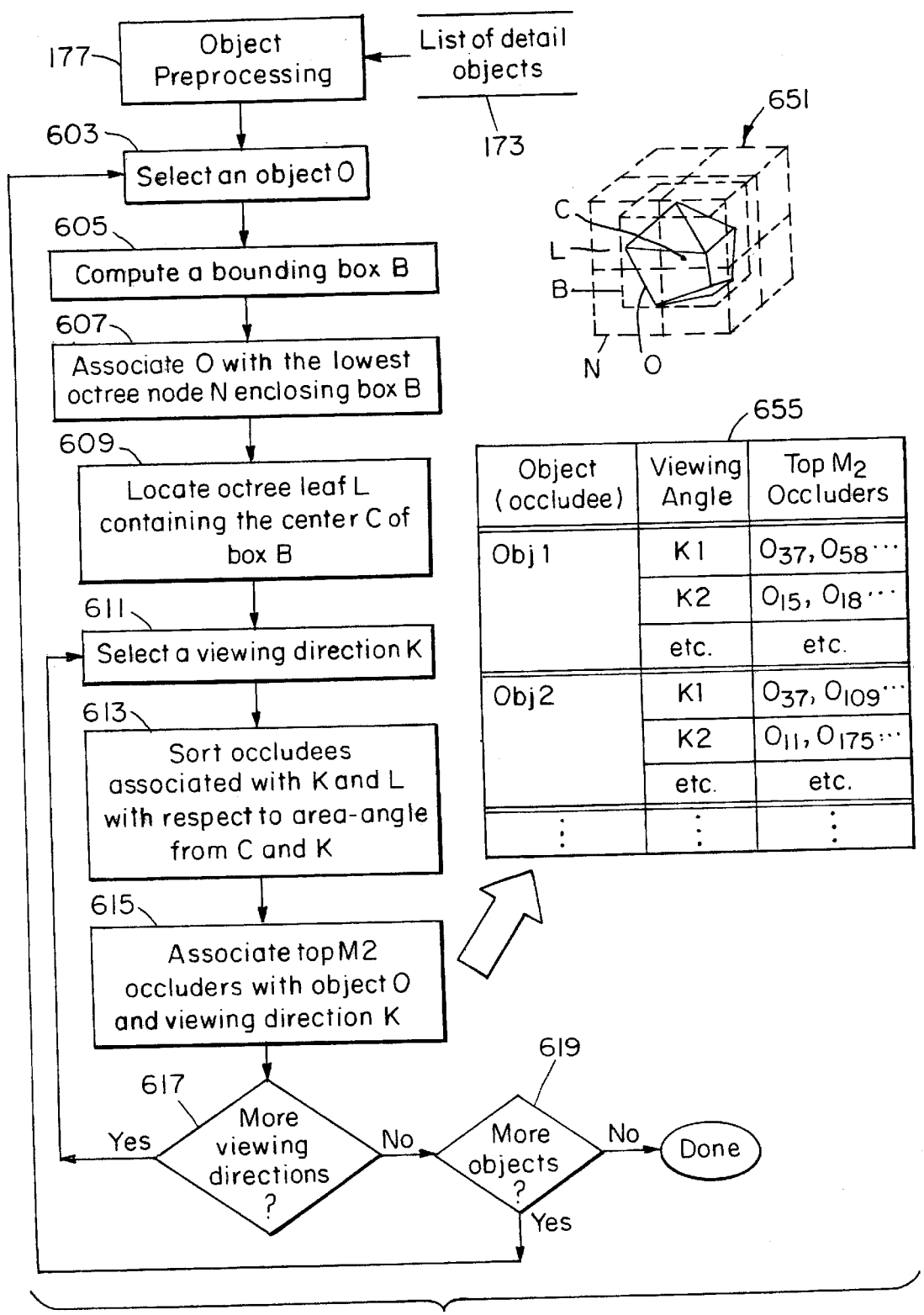
FIG. 19 is a flowchart of the object/occluder preprocessing procedure.

FIG. 19 is a flowchart of the object preprocessing procedure 177. As with the occluders, a predetermined list of detail objects 173 is provided as input. Outer loop 603–619 is executed for each detail object O.

After an object O is selected in step 603, a bounding box B is computed in step 605 such that box B completely encloses O. In step 607, object O is associated with the lowest (smallest) octree node N which encloses box B. This concept is depicted by reference 651, in which a box B has been calculated which encloses object O. Node N is the smallest node which encloses box B.

In step 609, the octree leaf L containing the center C of box B is determined. Now inner loop 611–617 is executed for each of the eight viewing directions K. After a viewing direction K is selected in step 611, in step 613 occluders associated with leaf L and viewing angle K (from lookup table 555, FIG. 17B) are sorted according to their area-angles with respect to the center C and the viewing angle K. In step 615, the top $M_2$ occluders are associated with the object O and the viewing angle. This process is repeated for each viewing direction K for each object.

Reference 655 depicts the resulting table which holds associations of occludee objects, viewing angles, and occluders, after the loop 603–619 has completed.

Viewpoint Change Calculations

Given an octree as in FIG. 3, the present invention finds those polygons in the octree that are not occluded by the specified occluders. The visibility status of some octree node T with respect to occluders in the set S when viewed from P is determined. If it is determined that T is visible, all polygons contained in T are collected into the set OS.

The visibility algorithm recursively applies the conservative visibility test to determine the visibility status of each octree node. First, the conservative visibility test is applied to determine whether a current node is fully occluded. If so, the test returns without performing any further work—the entire subtree rooted at the current node is occluded. If the current node is visible, the polygons within the node are "gathered" into the set OS. Otherwise the current node must be partially occluded, and the procedure recurses with those occluders that partially occlude the octree node, since only these occluders can occlude any descendant octree node.

The complexity of this algorithm is O(kv), where v is the number of octree nodes visited and k is the number of occluders. In the worst-case, this complexity could be O(kn) if the algorithm tests all octree nodes against all n occluders. In practice, the complexity is lower, as only a fraction of the octree nodes are tested against each occluder.

Figure 20:
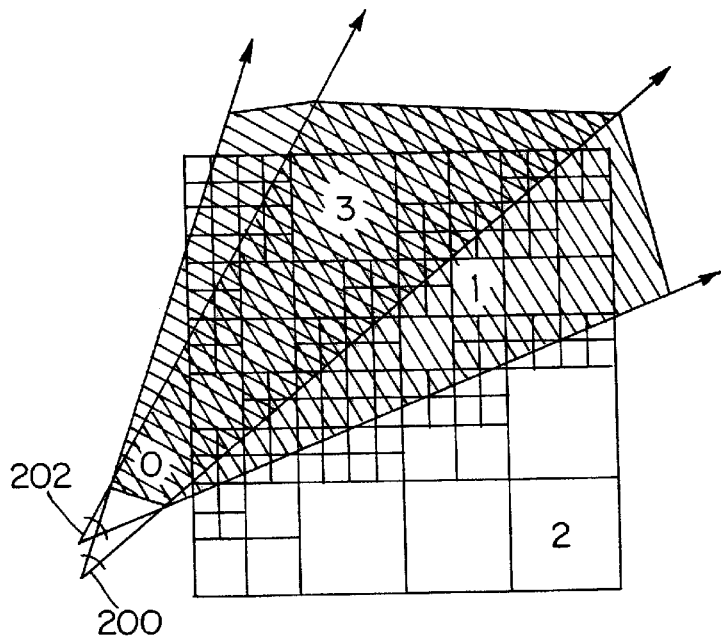
FIG. 20 is a drawing showing octree nodes classified with respect to a single occluder and two consecutive viewpoints. Subdivision is assumed to occur at the center of each octree node.

FIG. 20 shows octree nodes visited during visibility classification of a hierarchy with respect to a single occluder O and two consecutive viewpoints 200, 202. Note that using the hierarchy exploits spatial coherence by avoiding further testing within nodes that are completely occluded (e.g., node 1) or that are completely visible (e.g., node 2).

For a moving observer, the algorithm caches the occlusion relations—a list of supporting and separating planes—at each visited octree node. When the viewpoint changes, the algorithm need only check existing occlusion relations, and update those octree nodes whose visibility status has changed. For example, in FIG. 20, nodes in the dark region (e.g., node 3) are checked against the occluder in both traversals. For such nodes, the separating and supporting planes that are needed to determine their visibility status are computed only at the first viewpoint 200 and reused later. The cache entries corresponding to a node are maintained until the node is no longer involved in the visibility calculation (i.e., until an ancestor node becomes fully occluded or fully visible).

Figures 21, 22A:
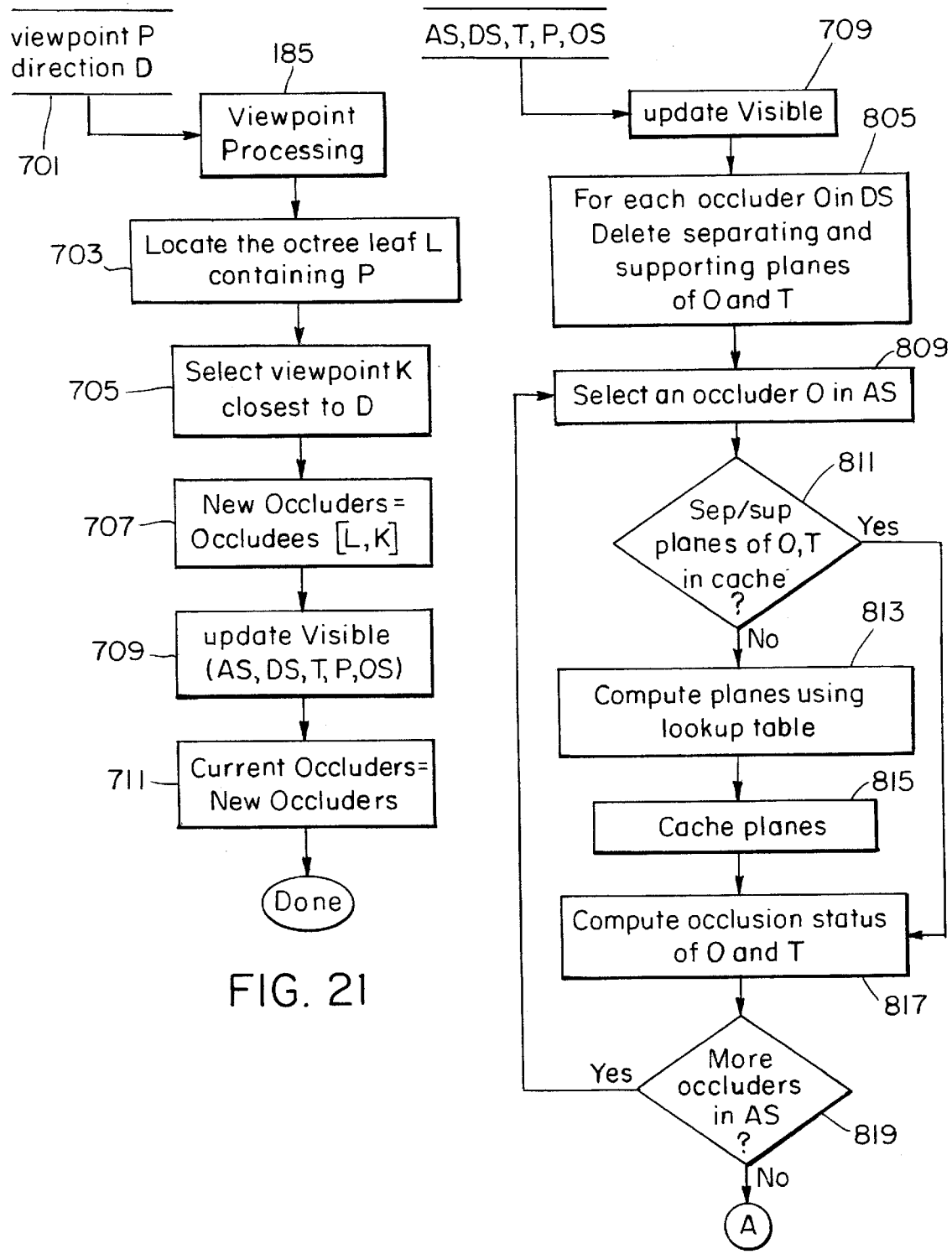
FIG. 21 is a flowchart of the viewpoint change preprocessing procedure.
FIGS. 22A–22C are a flowchart of the updateVisible algorithm.

FIG. 21 is a flowchart depicting the processing which occurs when the viewpoint moves. Note that a list of current occluders (CurrentOccluders), not shown, is maintained from viewpoint to viewpoint. A set of supporting planes and separating planes for the current occluders and objects they occlude is also maintained in a "plane cache" (115 of FIG. 1)

The procedure 185 takes as input a viewpoint P and a viewing direction D. Steps 703–707 function as an occluder identifier. First, in step 703, the octree leaf L containing the viewpoint P is determined. In step 705, the viewing angle K which is closest to D is selected. In step 707, a list of "new" occluders, NewOccluders is set to the list of occluders associated with leaf L and viewing angle K in table 555. Step 709 (shown in detail in FIGS. 22A,22B), the updateVisible procedure, is the object culler. This procedure, which is described in detail below, takes as input the list of new occluders AS=NewOccluders established in the previous step 707 to be added to the list of current occluders, and a list of occluders DS to be deleted from the list of current occluders. This list DS is simply a list of occluders which are in the list of current occluders but are not in the list of new occluders AS. Other inputs to the updateVisible procedure are current node T, the viewpoint P and a set of collected objects OS. Finally the list of current occluders CurrentOccluders is simply set equal to the list of new occluders, step 711.

Figure 22B:
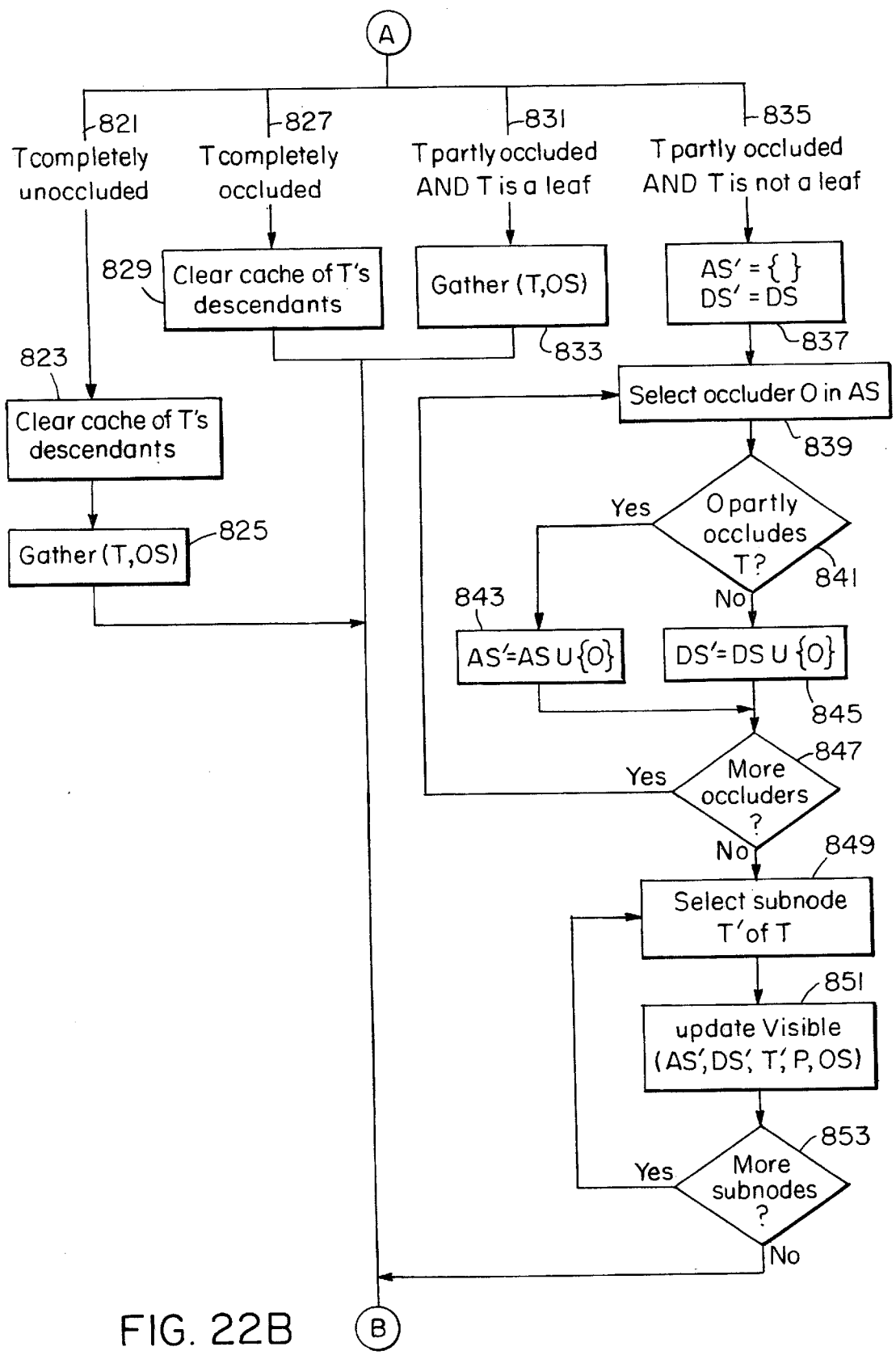
Figure 22C:
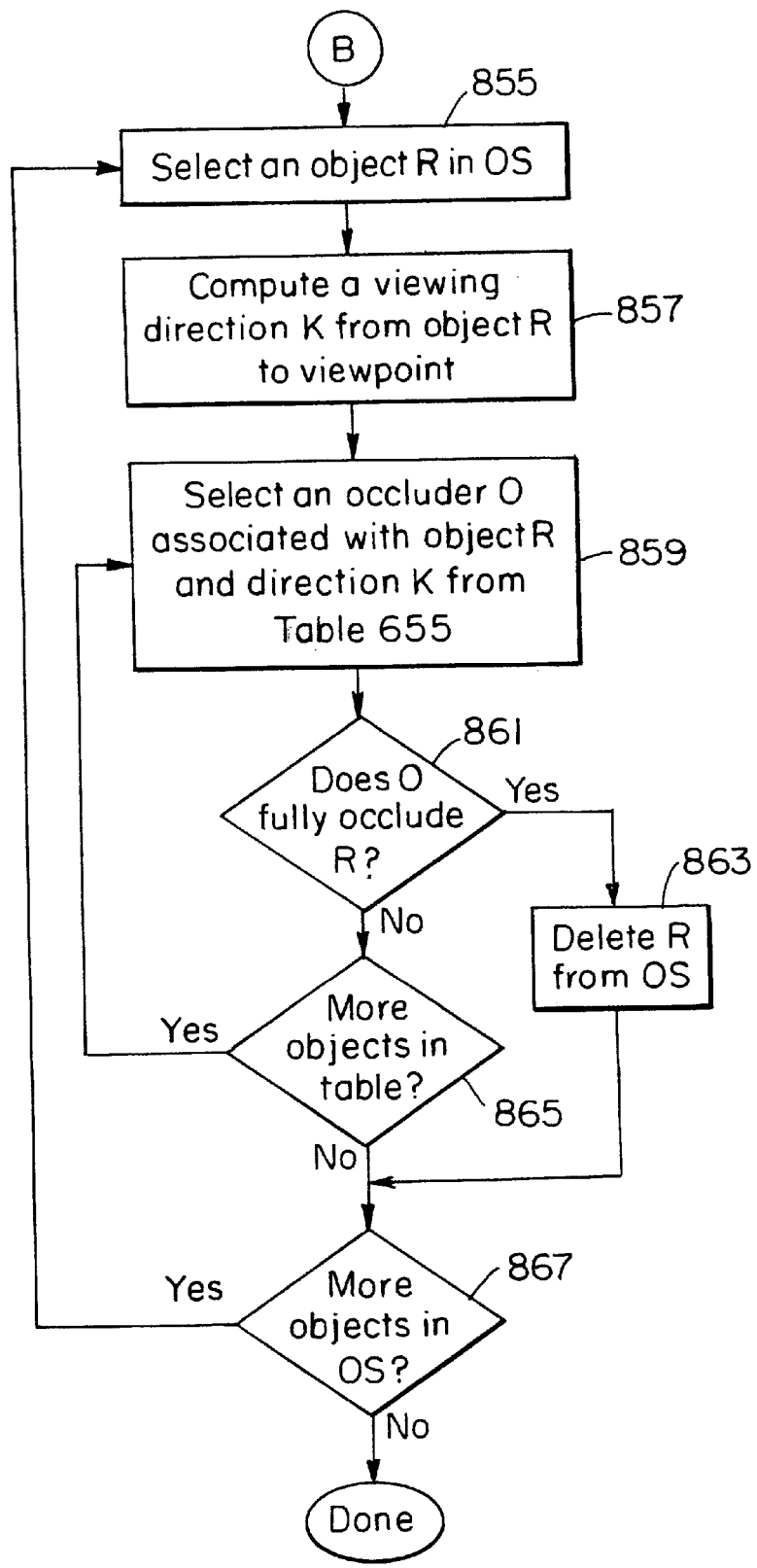

FIGS. 22A–22C are a flowchart of the updateVisible procedure 709, which recursively calls itself. Inputs AS, DS, T, P, OS are described above. First, for each occluder O in the set of objects to be deleted DS, all supporting and separating plane information associated with occluder O and node/leaf T is removed from the plane cache (step 805).

Loop 809–819 is then executed for each occluder O in AS. If separating and supporting planes of O and T are already in the cache, execution jumps from 811 to 817. Otherwise the planes must be computed (step 813) using lookup tables (described above) and cached in the plane cache (step 815). In step 817, the occlusion status of O and T is computed using supporting and separating planes as described earlier.

After completion of loop 809–819, one of four branches is taken depending on the status of the occlusion of node/leaf T. If T is completely unoccluded, branch 821 is followed. The plane cache is cleared of all of T's descendants (step 823), and all objects within T are "gathered" into OS, the list of objects to be rendered (step 825).

If, on the other hand, T is completely occluded, branch 827 is taken. Again, the plane cache is cleared of all of T's descendants (because only planes of T need be saved) in step 829. Note, however, that the objects within T are not gathered since they are not visible.

If T is partly occluded and T is a leaf, branch 831 is taken and T's objects are gathered into OS.

Finally, if T is partly occluded and T is not a leaf, branch 835 is followed. UpdateVisible recursively calls itself for T's subnodes. In step 837, two additional sets are defined: AS' set to an empty set; and DS', set to DS. Loop 839–847 is executed for each occluder O in AS to determine whether it should be included in AS'. In step 841 it is determined whether O partially occludes T. If so, O is added to the set AS'. If not, O is added to the set DS'. As a result, AS' will ultimately include only those occluders which partially occlude T. Now updateVisible is recursively executed (loop 849–853) for each subnode T' of T until some descendant of T is either completely occluded, completely unoccluded, or is a partially occluded leaf.

Up to this point, objects have been culled based on their occlusion by objects close to the viewpoint. Remaining (unculled) detail objects are now culled based on their occlusion by nearby objects, as shown in FIG. 22C.

For each object R remaining in OS, loop 855–867 is repeated. First, as object R is selected in step 855 and one of eight viewing directions K closest to the actual viewing direction from object R to the viewpoint is selected in step 857. Then, inner loop 859–865 is executed for each of the $M_2$ occluders in Table 655 (from FIG. 19) which have been associated with object R and viewing direction K.

Each occluder O is checked at step 861 to see if it occludes object R. If O does occlude R, R is culled from set OS (step 863) and will therefore not be rendered. The inner loop is exited, either when it is determined that R is occluded, or when there are no occluders from Table 655 left to test.

Referring back to FIG. 5, Step 187, the drawer, renders the gathered objects, i.e., those objects not culled.

In a preferred embodiment, view frustum culling is incorporated by first checking whether the octree node is inside the viewing frustum before invoking the visibility algorithm. However, any supporting and separating planes computed for nodes outside the viewing frustum are still retained in the cache so that they can be reused later.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A method of drawing an image constructed, relative to a viewpoint and a field of view, from a three-dimensional object data base comprising:

in object space, dynamically identifying individual occluders within the field of view;

in object space, determining and culling objects from the object data base which are within the field of view, but fully occluded from sight of the viewpoint by the identified occluders; and drawing objects which have not been culled from the object data base relative to the point of view.

2. A method as claimed in claim 1 wherein the object data base is partitioned into cells and objects are culled by determining whether cells which contain the objects are fully occluded from sight.

3. A method as claimed in claim 1 wherein an object is culled by defining a viewing region of object space from which the object is occluded from sight, and culling the object when the point of view is within the defined region.

4. A method as claimed in claim 3 further comprising:

dynamically determining information about viewing regions of object space from which objects are occluded and retaining this information for reuse by subsequent culling operations corresponding to a changed viewpoint.

5. A method as claimed in claim 4 wherein a region is defined by supporting planes which are tangential to an occluder and an object set.

6. A method as claimed in claim 5 wherein the object set is a cell partitioned from the object space.

7. A method as claimed in claim 5 wherein the object set is a single object.

8. A method as claimed in claim 1, further comprising identifying significant occluders by statically identifying potential occluders based on apparent size and dynamically selecting significant occluders based on current viewing direction.

9. A method as claimed in claim 8 wherein a determination of apparent size of an occluder is based on an estimate of the solid angle the potential occluder subtends relative to the viewpoint.

10. A method as claimed in claim 8 wherein a determination of apparent size of an occluder is based on an estimate of the solid angle the potential occluder subtends relative to a center of an object set.

11. A method as claimed in claim 1 wherein the step of culling comprises:

identifying a potential occluder relative to an object set from the object database;

defining a region of space from which the object set is occluded from sight by the potential occluder; and culling the object set when the point of view is within the defined region.

12. A method of drawing an image constructed relative to a viewpoint and a field of view, from a three-dimensional object data base comprising:

in object space, culling objects from the object data base through tests including:

determining and culling objects which are fully occluded from sight of the viewpoint due to occluders near to the point of view, and determining and culling objects which are fully occluded from sight of the viewpoint due to occluders near to the objects; and drawing objects which have not been culled from the object data base relative to the point of view.

13. A method as claimed in claim 12 wherein a region is defined by supporting planes which are tangential to an occluder and an object set.

14. A method as claimed in claim 13 wherein the object set is a cell partitioned from the object space.

15. A method as claimed in claim 13 wherein the object set is a single object.

16. A method as claimed in claim 12 further comprising:
retaining information about regions of object space from which each object is occluded for reuse by subsequent culling operations corresponding to a changed viewpoint.

17. A system for drawing an image constructed, relative to a viewpoint and a field of view, from a three-dimensional object data base comprising:
an occluder identifier which in object space, dynamically identifies individual occluders within the field of view;
a culler which in object space, determines and culls objects from the object data base which are within the field of view, but fully occluded from sight of the viewpoint by the identified occluders; and
a drawer which draws objects which have not been culled from the object data base relative to the point of view.

18. The system of claim 17 wherein the object data base is partitioned into cells and culled objects are selected from the object data base by determining whether cells which contain the objects are fully occluded from sight.

19. The system of claim 17 wherein an object from the object data base is identified as a culled object when the point of view is within a viewing region of object space from which the object is occluded from sight.

20. The system of claim 19 wherein information about viewing regions of object space from which objects are occluded is dynamically determined and retained for reuse by subsequent identification of culled objects for a changed viewpoint.

21. The system of claim 20 wherein a region is defined by supporting planes which are tangential to an occluder and an object set.

22. The system of claim 21 wherein the object set is a cell partitioned from the object space.

23. The system of claim 21 wherein the object set is a single object.

24. The system of claim 17 wherein occluders are dynamically identified by first statically identifying potential occluders based on apparent size, and then selecting significant occluders from among the potential occluders based on current viewing direction.

25. An article of manufacture, comprising:
a computer-readable medium;
on the computer-readable medium, a computer-implemented program for drawing an image constructed, relative to a viewpoint and a field of view, from a three-dimensional object data base, the program comprising:
an occluder identifier which in object space, dynamically identifies individual occluders within the field of view;
a culler which in object space, determines and culls objects from the object data base which are within the field of view, but fully occluded from sight of the viewpoint by the identified occluders; and
a drawer which draws objects which have not been culled from the object data base relative to the point of view.

26. The article of claim 25 wherein the object data base is partitioned into cells and objects are culled by determining whether cells which contain the objects are fully occluded from sight.

27. The article of claim 25 wherein an object is culled by defining a viewing region of object space from which the object is occluded from sight, and culling the object when the point of view is within the defined region.

28. The article of claim 27 further comprising dynamically determining information about viewing regions of object space from which objects are occluded and retaining this information for reuse by subsequent culling operations corresponding to a changed viewpoint.

29. The article of claim 28 wherein a region is defined by supporting planes which are tangential to an occluder and an object set.

30. The article of claim 29 wherein the object set is a cell partitioned from the object space.

31. The article of claim 29 wherein the object set is a single object.

32. The article of claim 25 wherein the occluder identifier dynamically identifies significant occluders by first statically identifying potential occluders based on apparent size and then dynamically selecting significant occluders based on current viewing direction.

33. The article of claim 32 wherein a determination of apparent size of an occluder is based on an estimate of the solid angle the potential occluder subtends relative to the viewpoint.

34. The article of claim 32 wherein a determination of apparent size of an occluder is based on an estimate of the solid angle the potential occluder subtends relative to a center of an object set.

35. The article of claim 25 wherein the culler culls objects dynamically by:
identifying a potential occluder relative to an object set from the object database,
defining a region of space from which the object set is occluded from sight by the potential occluder, and
culling the object set when the point of view is within the defined region.

36. An article of manufacture, comprising:
a computer-readable medium;
in the computer-readable medium, a computer-implemented method for drawing an image constructed, relative to a viewpoint and a field of view, from a three-dimensional object data base, the method comprising the steps of:
culling, in object space, objects from the object data base through tests including:
determining and culling objects which are fully occluded from sight of the viewpoint due to occluders near to the point of view, and
determining and culling objects which are fully occluded from sight of the viewpoint due to occluders near to the objects; and
drawing objects which have not been culled from the object data base relative to the point of view.

* * * * *